United States Patent [19]

Simmerlein-Erlbacher

[11] Patent Number: 5,041,146
[45] Date of Patent: Aug. 20, 1991

[54] FILTER APPARATUS

[76] Inventor: Ewald-Wilhelm Simmerlein-Erlbacher, Langer Berg 2, DE-8570 Pegnitz, Fed. Rep. of Germany

[21] Appl. No.: 477,880
[22] PCT Filed: Jul. 29, 1989
[86] PCT No.: PCT/DE89/00495
  § 371 Date: Apr. 2, 1990
  § 102(e) Date: Apr. 2, 1990
[87] PCT Pub. No.: WO90/01362
  PCT Pub. Date: Feb. 22, 1990

[51] Int. Cl.$^5$ ............................................. B03C 3/01
[52] U.S. Cl. .................................... 55/126; 55/188;
         55/233; 55/444; 55/446
[58] Field of Search .............. 55/126, 185, 186, 188,
         55/233, 320, 360, 443, 444, 446, 484–486

[56] References Cited

U.S. PATENT DOCUMENTS

| | | | |
|---|---|---|---|
| 718,805 | 1/1903 | Watts | 55/485 X |
| 1,521,348 | 12/1924 | Ambruster | 55/444 |
| 4,427,423 | 1/1984 | Montierth | 55/484 X |
| 4,477,263 | 10/1984 | Shaver et al. | 55/126 X |
| 4,806,148 | 2/1989 | Ottengraff | 55/233 X |
| 4,938,787 | 7/1990 | Simmer-Erlbacher | 55/233 |

OTHER PUBLICATIONS

PCT publication No. WO88/03049, 5-5-88.

Primary Examiner—Charles Hart
Attorney, Agent, or Firm—Elliot M. Olstein; Raymond J. Lillie

[57] ABSTRACT

Described is a filter apparatus (10) which is designed for filtering solid, liquid or gaseous, electrically uncharged or electrically charged particles out of a gaseous flow medium as it flows through the filter apparatus (10). The filter apparatus (10) has filter elements (18) which are spaced from each other in the direction of flow of the gaseous medium to the apparatus. Each filter element (18) has a plate-like carrier element (20, 46, 48; 64) and a substrate (22) which are provided with spaced-apart openings (26). The substrate (22) serves for the storage of a filter medium. Each opening (26) in the filter element (18) has a sleeve-like guide element (24) for the flow medium, wherein the guide element (24) extends around the edge of the corresponding opening (26). The guide elements (26) which project at least at the upstream side prevent filter medium at the individual substrates (22) from being unintentionally entrained through the openings (26), even at high flow rates in respect of the flow medium.

24 Claims, 3 Drawing Sheets

FILTER APPARATUS

The invention relates to a filter apparatus for filtering solid, liquid or gaseous, electrically charged or electrically uncharged particles out of a gaseous flow medium which flows through the filter apparatus, comprising filter elements which are spaced from each other in the direction of flow of the gaseous medium to the filter apparatus, wherein each filter element has a plate-like carrier element with spaced-apart openings therethrough, the openings of adjacent plate-like carrier elements are displaced relative to each other in such a way that they are not aligned with each other, and each plate-like carrier element has at least on its upstream side a substrate which is provided for the storage of a filter medium and which is provided with openings corresponding to the openings in the associated plate-like carrier element.

A filter apparatus of that kind is known from DE 36 37 428 Al. In that arrangement the substrate which is provided for storage of the filter medium comprises for example a foam material. The carrier elements for the substrates may also be formed from a plastics material. That known filter apparatus uses in particular glycerine, to which further substances may be added, as the filter medium.

DE 37 11 294 Al describes a filter apparatus of the kind set forth in the opening part of this specification, in which the filter medium used is for example glycerine or glycol or mixtures of those substances. In that known filter apparatus the filter medium is passed from a collecting container in a circuit to the spaced-apart filter elements which are arranged in succession in the direction of flow of the gaseous medium to the apparatus. For that purpose, the apparatus has a conveyor means for the filter medium. The plate-like carrier elements of the individual filter elements are preferably in the form of plastics carrier plates, with the substrates for storage of the filter medium being disposed on the upstream sides thereof. The substrates are preferably in the form of foam plates.

In all those known filter apparatuses, the openings in the individual filter elements are in the form of through slots.

It has been found that the filter action of such filter apparatuses, with a given flow rate in respect of the gaseous flow medium to be filtered, through the filter apparatus, is better for heavy particles which are to be filtered than for light particles which are to be filtered. Furthermore, when carrying out operational tests in respect of such filter apparatuses, it was found that the filter effect increases with an increasing rate of flow of the gaseous flow medium to be filtered, both for light particles to be filtered and also for heavy particles. That means however that a relatively high rate of flow of the gaseous flow medium through the filter apparatus is a desirable aspect. The rate of flow of the gaseous flow medium has hitherto been limited in an upward direction by virtue of the fact that, at very high flow rates, particles of the filter medium can be entrained with the gaseous flow medium which flows through the filter elements. That has at least an adverse effect on the desired filtering or cleaning action of the filter apparatus.

The invention is therefore based on the problem of so improving a filter apparatus of the kind set forth in the opening part of this specification, with simple means, that the filter or cleaning action of the filter apparatus is further improved.

In accordance with the invention, that problem is solved in that the/each plate-like carrier element comprises a material which is impervious in relation to the filter medium, and that each opening in the plate-like carrier element has a sleeve-like guide element for the flow medium, which extends around the edge of the opening and which is directed at least approximately normal to the plate-like carrier element.

By virtue of the fact that each plate-like carrier element, with the exception of the openings therein, is impervious to the filter medium, the filter medium is unable accidentally to pass through the plate-like carrier elements. The sleeve-like guide elements for the flow medium provide the advantage that the particles of filter medium, which are present at the edge of the openings, are separated in space from the gaseous flow medium by the sleeve-like guide elements so that those particles of the filter medium which are to be found at the edge of the openings cannot be entrained with the gaseous flow medium which flows through the openings, that is to say the sleeve-like guide elements. That provides a substantial improvement in the filter effect.

The/each guide element of the filter apparatus may be in the form of a collar which projects from the plate-like carrier element on the upstream side of the carrier element. In the case of a plate-like carrier element comprising a sheet metal material, such a collar can be formed in a simple manner by a pressing operation, a deep drawing operation or the like. It is even simpler for the/each guide element to be in the form of a collar if the plate-like carrier element comprises a plastics material.

It has been found particularly advantageous for the guide element to be enlarged to form a flanged edge at its upstream front end which is remote from the plate-like carrier element. That flanged edge on the upstream front end of the guide element prevents particles of the filter medium from accidentally passing through, even when using very high flow rates in respect of the gaseous flow medium. In that way it is possible for the filter apparatus to be operated at very high flow rates, in comparative terms, and it is thus possible for not only heavy but also very light, solid, liquid or gaseous, electrically charged or electrically uncharged particles to be filtered out of the flow medium as it flows through the apparatus.

As has already been indicated hereinbefore in connection with the guide element in the form of a collar, the guide element can be made in one piece with the plate-like carrier element. Such a configuration for the/each guide element gives the advantage that the guide elements do not need to be produced in their own working operation and then joined to the plate-like carrier elements in a further working operation. Such a filter apparatus can accordingly be produced in a very simple and inexpensive manner.

In another configuration of the filter apparatus, the or each guide element can be in the form of a sleeve element which passes through the associated plate-like carrier element, one end portion of the sleeve element projecting beyond the carrier element on the upstream side while the second end portion of the sleeve element projects beyond the carrier element on the downstream side. When the filter apparatus is of such a design configuration, the two end portions provide for an increase in the change in direction of the gaseous flow medium, that is to say a greater degree of curvature in the flow path of the flow medium, and thus an improvement in the filter effect. In addition by suitable dimensioning of the individual guide elements or the spacing between adjacent filter elements, it is possible to achieve optimisation of the flow rate of the filter medium for the solid, liquid and/or gaseous particles which are to be filtered out of the flow medium.

In a filter apparatus of the last-mentioned kind, that is to say in a filter apparatus in which the/each guide element is in the form of a sleeve element passing through the associated plate-like carrier element, it has been found advantageous for the/each guide element to be in the form of a venturi nozzle. Making the individual guide elements in the form of venturi nozzles gives the advantage that the pressure drop for the flow medium through the individual filter elements remains at a comparatively low level. Thus, with such a configuration of the filter apparatus, it is possible for the flow medium which flows through the filter apparatus to be moved therethrough with a comparatively low level of drive energy.

The/each guide element of the filter apparatus, that is to say each individual filter element of the filter apparatus, may have at least one fixing member with which the guide element is fixed in one of the openings in the plate-like carrier element. Such a design is advantageous in particular when the individual guide elements are not formed in one piece with the associated carrier element. The last-mentioned fixing members may be per se known snap-engagement retaining members, elements of a per se known bayonet-type securing arrangement, or the like.

In the above-described configurations of the filter apparatus, the/each plate-like carrier element of the associated filter element is in one piece with a given wall thickness, the wall thickness of the carrier element being dependent on its dimensions in terms of surface area, the flow rate of the flow medium and the particles to be filtered out in the flow medium. A further embodiment of the filter apparatus according to the invention is characterised in that the/each plate-like carrier element has two spaced-apart outside walls which have mutually aligned apertures through which respective ones of the associated guide elements sealingly extend, wherein either the first outside wall on the upstream side and the associated substrate or the second outside wall on the downstream side is provided with through orifices which are spaced from the openings for the guide elements. If the first outside wall on the upstream side and the associated substrate of the/each filter element is provided with through orifices, it is possible for particles which pass through those orifices into the hollow space between the first and second outside walls to be removed from that space, thereby to provide a specific filter effect. As the through orifices are to be provided in particular in the vicinity of the openings for the guide elements, it is possible with a filter apparatus of such a configuration for relatively heavy particles to be filtered out of the flow medium which flows through the filter apparatus. The lighter particles to be filtered out, which are transported with the flow medium, as well as the still heavier particles, are deposited at the substrate and filtered out. That means that a specific filtration effect can be achieved in respect of a given section of the mass spectrum of the particles to be filtered out, by virtue of the through orifices in the first outside wall on the upstream side and in the associated substrate. If it is only the second outside wall on the downstream side that has through orifices of that kind, it is possible for example for a fluid medium to be introduced into the filter apparatus through the hollow space between the first and second outside walls, and through the through openings provided in the second outside wall on the downstream side, in order as desired to moisten the gaseous flow medium which flows through the individual filter elements and which is charged with particles to be filtered out.

It is also possible for an intermediate wall to be provided between the two outside walls of the/each plate like-carrier element, the intermediate wall forming two mutually separated central spaces, wherein the intermediate wall and the two outside walls and the associated substrate are provided with mutually aligned openings through which a respective one of the associated guide elements sealingly extends while the two outside walls and the associated substrate are provided with through orifices which are spaced from the openings for the guide elements, and the first central space which is defined by the intermediate wall and the first outside wall on the upstream side is provided with an outlet member and the second central space defined by the intermediate wall and the second outside wall on the downstream side is provided with an inlet member. The solid, liquid or gaseous particles to be filtered out, which are accumulated in the first central space, can be removed from the filter apparatus through the outlet member and for example subjected to reprocessing. A liquid vapour or mist or a gaseous medium for example can be introduced into the filter apparatus through the inlet member.

In a filter apparatus of the last-described kind, a cleaning means may be provided between the inlet member associated with the second central space and the outlet member associated with the first central space. The particles which are filtered out of the gaseous flow medium and which issue from the filter apparatus through the outlet member can be cleaned in the cleaning means, for example the solid materials may be separated from the gaseous components of the particles to be filtered, whereupon the gaseous components can be re-introduced into the filter apparatus through the inlet member. In that way it is possible to maintain the desired pressure conditions in the filter apparatus.

The substrates which are provided for storage of the filter medium may comprise for example a foam material, a foam ceramic, a metal mesh or the like. The filter medium used may be glycerine, glycol or a mixture of glycerine and glycol, while certain additives such as $SiO_2$, $Al_2O_3$, perfumes or the like may be added to the filter medium.

Such a filter apparatus provides an excellent filter effect for solid, liquid or gaseous, charged or uncharged particles which are transported with a gaseous flow medium which is introduced into the filter apparatus. A further advantage is that such a filter apparatus has a long operating or service life so that such a filter apparatus can be used without maintenance for example in relation to motor vehicles for providing for a supply of fresh air.

At least some filter elements may be connected to a terminal of a dc voltage source. In that way correspondingly charged ions can be attracted to the filter elements.

A further improved specific filter effect in respect of particles which hitherto it has not been possible adequately to filter out is provided if the filter elements are combined together in groups, wherein each individual group of filter elements has associated therewith its own collecting, conveyor and discharge means. By virtue of the filter apparatus being of such a configuration, it is possible for the individual groups of filter elements to be wetted with different filter media. With different filter media of that kind, it is possible for the solid, liquid or gaseous particles of noxious material which are transported with the gaseous flow medium flowing through the filter apparatus to be filtered out of the flow medium in a controlled manner in the individual groups of filter elements. In addition, with such a filter apparatus, it is possible to use different filter media which are not compatible with each other. In such a situation it is of course possible for the different filter media to be retained in the associated groups of filter elements, that is to say, to be limited to those groups.

It has been found to be advantageous for at least individual groups of filter elements to be provided with their own respective cooling and/or heating means for the associated filter medium. With such cooling or heating means, it is possible for the filter media associated with individual groups of filter elements to be kept at the respective temperature which is the optimum one for the filter medium, while different filter media of the filter apparatus can be heated to or cooled down to different temperatures.

At least some of the groups of filter elements may be provided with their own cleaning or regenerating means for the associated filter medium. With such a cleaning means it is possible for the filter medium of the corresponding group of filter elements to be removed from the filter apparatus and cleaned in the cleaning means and for the cleaned filter medium to be restored to the filter apparatus. It is likewise possible to regenerate an exhausted filter medium by means of the regenerating means, and to restore it to the filter apparatus in a regenerated condition. A filter apparatus of the last-mentioned kind thus gives the advantage of having a very long service life.

The filter medium is preferably glycerine, glycol or a mixture of glycerine with glycol, while additives of for example $SiO_2$, $Al_2O_1$, perfume substances or the like may be added to such a filter medium. At least one filter medium for at least one group of filter elements may contain a culture of enzymes. It is likewise possible for at least one filter medium to contain a bacterial culture. Depending on the particles of noxious material which are to be filtered out by means of the filter apparatus, at least one filter medium of at least one group of filter elements may also contain microorganisms. By virtue of such enzyme and/or bacterial cultures or microorganisms, it is possible for particles of noxious material to be filtered out in a controlled manner in the individual filter elements or groups thereof, so that the result is a filter apparatus with excellent filtration properties. Such filter media may also be suitable for converting the aggregate condition of particles of noxious material so that it is possible for example by means of microorganisms to convert liquid particles of noxious material into gaseous form.

A survival storage means is preferably provided for the respective organic filter medium. The purpose of such a survival storage means is to keep the respective organic filter medium alive and thus effective, if the filter apparatus is not in use for a given period of time, so that the organic filter medium is not supplied with the substances required for it to survive. During that period of time the respective organic filter medium is supplied with the substances required for it to continue to survive, by means of the survival storage means.

It has been found advantageous to provide a housing which is of a varying internal cross-section between an inlet and an outlet, along the longitudinal extent of the housing, wherein the filter elements or groups of filter elements arranged in the housing are each of a surface area corresponding to the corresponding internal cross-section of the housing. In that way it is possible for the flow medium which flows through the filter apparatus to flow through the filter elements or groups of filter elements at different rates. In that way the speed of the gaseous flow medium which is charged with particles of noxious material in the individual filter elements or groups of filter elements can be adapted in the optimum fashion to the particles of noxious material which are to be filtered out in a controlled manner in those filter elements or groups thereof. Suitable selection in respect of the filter medium in each individual group of filter elements and suitable selection in respect of the rate of flow of the gaseous flow medium in the corresponding group of filter elements makes it possible for the individual solid, liquid or gaseous particles of noxious material to be filtered out of the flow medium in a specific and optimum fashion in the successively disposed groups of filter elements. That arrangement provides a filter apparatus with excellent filtration properties and with the further considerable advantage that widely different combinations of filter media and flow rates can be combined so that such a filter apparatus can be employed over a wide area of use.

The internal cross-section of the housing preferably decreases in a direction from the inlet to the outlet of the filter apparatus. In that way the rate of flow of the flow medium in the filter apparatus increases from one group of filter elements to the next group or the subsequent groups so as to provide a very good filter effect. More specifically, it has been found that, with a constant rate of flow of the flow medium, heavy particles of noxious material are filtered out better than lighter particles. On the other hand it was found in operational tests that the filter effect in respect of particles of noxious material of a given mass, that is to say a given weight, becomes progressively better with an increasing rate of flow of the flow medium. That means that it is desirable to use the highest possible rate of flow. The rate of flow of the flow medium however is limited in an upward direction by the structure of the filter apparatus and the materials used for the filter elements. It is therefore desirable for the heavy particles of noxious material to be first filtered out in the groups of filter elements which are adjacent to the inlet of the filter apparatus, with a comparatively low flow rate being sufficient for that purpose, while the light particles of noxious material are only then filtered out of the flow medium as it flows through the filter apparatus, in groups of filter elements which are further away from the inlet, which is made possible by increasing the flow rate.

The internal cross-section of the housing may decrease continuously or preferably in a stepwise manner in a direction from the inlet to the outlet. A stepwise configuration of the housing gives the advantage that the filter elements of the groups associated with the individual steps are of the same size so that the expenditure involved in regard to manufacture of the filter elements or groups of filter elements is immaterial.

The filter apparatus according to the invention may be used in any desired position. It has been found advantageous however for the filter apparatus to be used in a horizontal position, that is to say the longitudinal extent of the housing, which is defined between the inlet and the outlet of the housing of the filter apparatus, is directed at least approximately horizontally. In that case the filter elements are preferably arranged at an inclined angle from the top front towards the bottom rear, relative to the longitudinal axis of the housing, which extends between the inlet and the outlet. That angle of inclination is preferably adapted to the resultant which is defined by the horizontally extending component of the flow rate of the flow medium and the vertical gravitational component. That inclined arrangement of the filter elements or groups of filter elements thus prevents liquid filter medium from accidentally dripping off the individual filter media of the groups of filter elements.

The angle of inclination of the individual filter elements or the angle of inclination of the filter elements of the various groups of filter elements may be variable or set in dependence on the rate of flow of the flow medium to and through the filter elements. When the angle of inclination is fixed and invariable, that arrangement provides only for an average approximation or adaptation to the rate of flow of the flow medium through the apparatus. If the angle of inclination is variable, it is possible to provide for a precise adaptation effect. The first-mentioned case means that the filter apparatus is of a simpler design than the last-mentioned case with a variable angle of inclination.

Further details, features and advantages will be apparent from the following description of embodiments of the filter apparatus according to the invention, as illustrated in the drawing in which.

Figure 1:
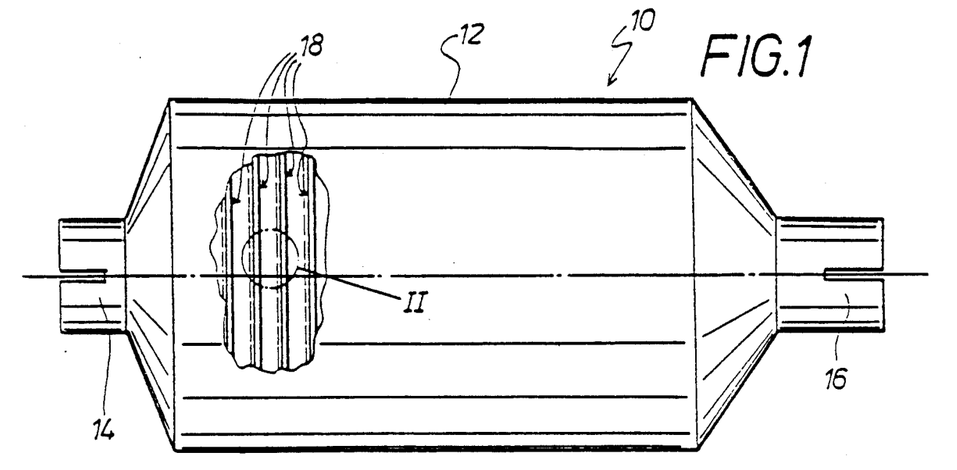
FIG. 1 is a partly sectional side view on a reduced scale of a filter apparatus.

FIG. 1 shows a filter apparatus 10 having a housing 12 comprising an inlet connection 14 and an outlet connection 16. A gaseous flow medium is introduced into the filter apparatus 10 through the inlet connection 14. The flow medium is charged with solid, liquid and/or gaseous particles which are to be filtered out of the gaseous flow medium, that is to say separated therefrom, by means of the filter apparatus 10. For that purpose the filter apparatus 10 has a number of filter elements 18 which are arranged in succession at spacings from each other in the housing 12. The filter elements 18 are described in detail hereinafter with reference to FIGS. 2 to 7.

FIG. 1 shows some filter elements 18 in a filter apparatus which is disposed horizontally, the filter elements being shown as standing at least approximately vertically. It will be appreciated that it is also possible for the filter apparatus 10 to be disposed and operated in any other position. For example it would be possible for the filter apparatus 10 to be arranged vertically so that the filter elements 18 are arranged in horizontal planes which extend above or below each other. In that case it is necessary for the inlet connection 14 to be arranged at the top and for the outlet connection 16 to be arranged at the bottom. That is related to the fact that the guide elements which are described in detail hereinafter project away at least from the upstream side of the individual filter elements, as will be made clear hereinafter with reference to FIGS. 2 to 7.

Figure 2:
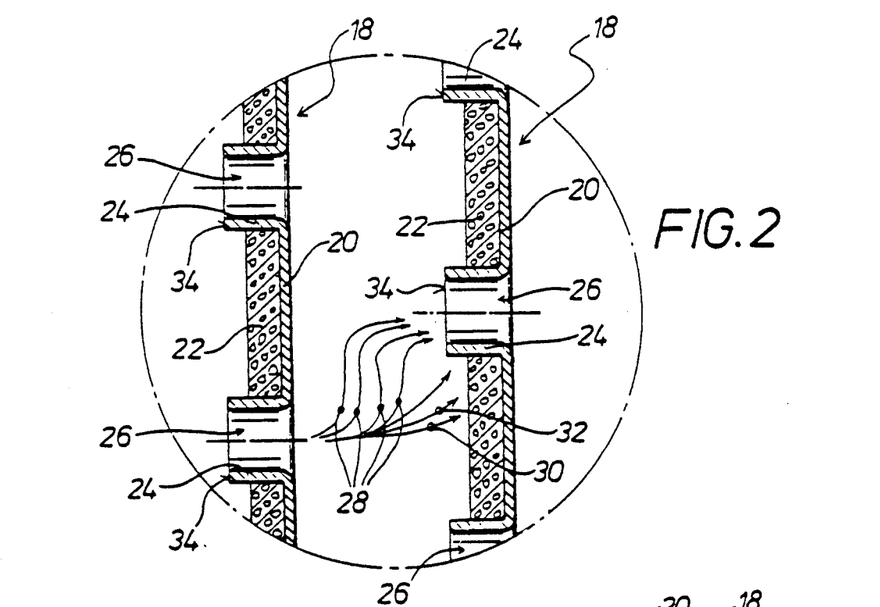
FIG. 2 is a view on an enlarged scale of the detail II in FIG. 1.

FIG. 2 shows two filter elements 18 which are arranged at a spacing from each other and in succession and each of which has a plate-like carrier element 20 of a material which is impervious to the filter medium, and a substrate 22 for storage of the filter medium. The substrate 22 is provided on the upstream side of the associated plate-like carrier element 20. The carrier element 20 may be a member of sheet metal, a plastics plate or the like. The substrate 22 may comprise a plastics foam material, a foam ceramic, a wire mesh or the like. Each plate-like carrier element 20 is provided with guide elements 24 which project from the carrier element 20 on the upstream side thereof and which are in the form of a collar. The collar-like guide elements 24 define through openings 26 through which the gaseous medium flows through the individual filter elements 18. Thin curved lines 28 in FIG. 2 diagrammatically indicate the flow of the gaseous flow medium between adjacent filter elements 18, that is to say between mutually displaced openings 26 in adjacent filter elements 18. The line 30 diagrammatically indicates the trajectory of relatively heavy particles, with the radius of curvature of that trajectory being relatively large as a result of the comparatively high mass of the particles.

The line 32 identifies the trajectory of a somewhat lighter particle, with the particles which pass along the lines 30 and 32 meeting the substrate 22 and being retained by means of the filter medium on or in the substrate 22, at the filter element 18. That provides for particles being filtered out of the gaseous flow medium. By suitable dimensioning of the spacing between adjacent filter elements 18, the spacing between adjacent openings 26 which are arranged for example in the form of a grid matrix, the diameter of the openings 26 and the flow rate of the gaseous flow medium through the filter apparatus, that is to say through the individual filter elements 18, it is possible for the solid, liquid and/or gaseous particles which are transported with the gaseous flow medium to be filtered out of same.

As the collar-like guide elements 24 project beyond the associated substrate 22 with their upstream front end 34 which is remote from the associated plate-like carrier element, the filter medium on each substrate 22 is prevented from being entrained through the individual openings 26 by the gaseous flow medium. Accordingly the loss of filter medium is negligibly low so as to provide a maintenance-free filter apparatus.

Figure 3:
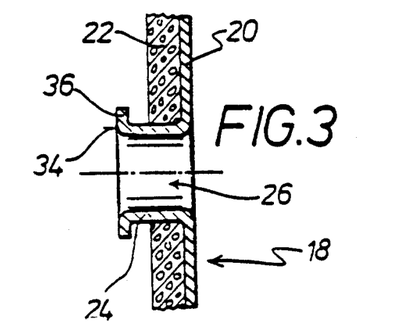
FIG. 3 is a sectional view of a portion of an embodiment of a filter element.

FIG. 3 shows a portion of a plate-like carrier element 20 of a filter element 18, which is provided with collar-like guide elements 24 of which only one is shown. The collar-like guide element 24 projects away from the upstream side of the plate-like carrier element 20 at least approximately perpendicularly, with the collar-like guide element 24 defining an opening 26. The gaseous flow medium which is charged with solid, liquid or gaseous particles to be filtered out can flow through the opening 26. As described hereinbefore with reference to FIG. 2, different particles are filtered out at the individual filter elements 18 (see the lines 30 and 32 in FIG. 2). For that purpose each filter element 18 is provided with a substrate 22 which is disposed on the upstream side of the associated carrier element 20. In the embodiment of the filter element 18 shown in FIG. 3, the individual collar-like guide elements 24 are of an axial dimension which is greater than the wall thickness of the substrate 22 having the filter medium. In the construction shown in FIG. 3 the collar-like guide element 24 is enlarged to form a flanged edge 36 at its front end 34 on the upstream side, which is remote from the plate-like carrier element 20. The flanged edge 36 provides a further improved retaining effect for the filter medium in or on the substrate 22 so that, even at very high flow rates in respect of the gaseous flow medium flowing through the openings 26, the filter medium is not entrained through the openings 26. That provides a further improvement in the filter effect and at the same time a further improvement in regard to freedom from maintenance of a filter apparatus equipped with such filter elements 18.

Figure 4:
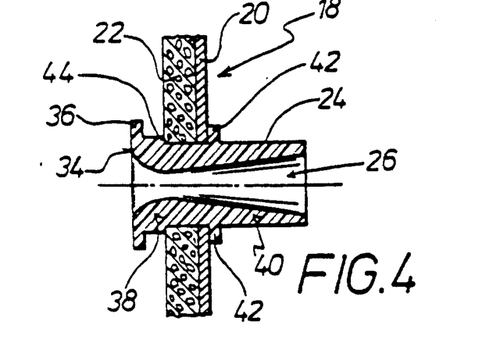
FIG. 4 is a sectional view corresponding to FIG. 3 of a second embodiment of a filter element of which a portion is shown.

FIG. 4 is a sectional view of a portion of a filter element 18 in which the/each guide element projects with a first end portion 38 on the upstream side beyond the plate-like carrier element 20 or the substrate 22 for the filter medium, and wherein a second end portion 40 projects beyond the plate-like carrier element 20 on the downstream side. In that arrangement the guide element 24 is in the form of a venturi nozzle, that is to say the opening 26 is of a venturi nozzle-like configuration. With that configuration of the/each filter element 18, the front end 34 is also provided with a flanged edge 36 in order reliably to prevent accidental entrainment of filter medium in/on the substrate 22. Fixing members 42 and 44 serve for mechanically fixing the individual guide elements 24 to the associated filter elements 18. The fixing members 44 are in the form of projections which extend around the associated guide elements 24 and the fixing members 42 can be for example in the form of knob-like raised portions. In order to ensure that the guide elements 24 are fixed to the individual filter elements 18 with such fixing members 42 and 44, the associated plate-like carrier elements 20 and the corresponding substrates 22 may be provided with longitudinal recesses which extend in the axial direction and which correspond to the knob-shaped fixing members 42, thereby providing per se known bayonet-type fixing arrangements. If the material of the guide elements 24 is sufficiently elastically yielding, the guide elements 24 may also be fixed in position by simple snap-engagement retaining action. Guide elements 24 of a venturi nozzle-like configuration give the particular advantage that the pressure drop in respect of the gaseous flow medium which flows through the openings 26 is comparatively low, even at relatively high flow rates, so that the drive energy for passing the flow medium through the filter apparatus can be relatively low.

Figures 5, 6, 7:
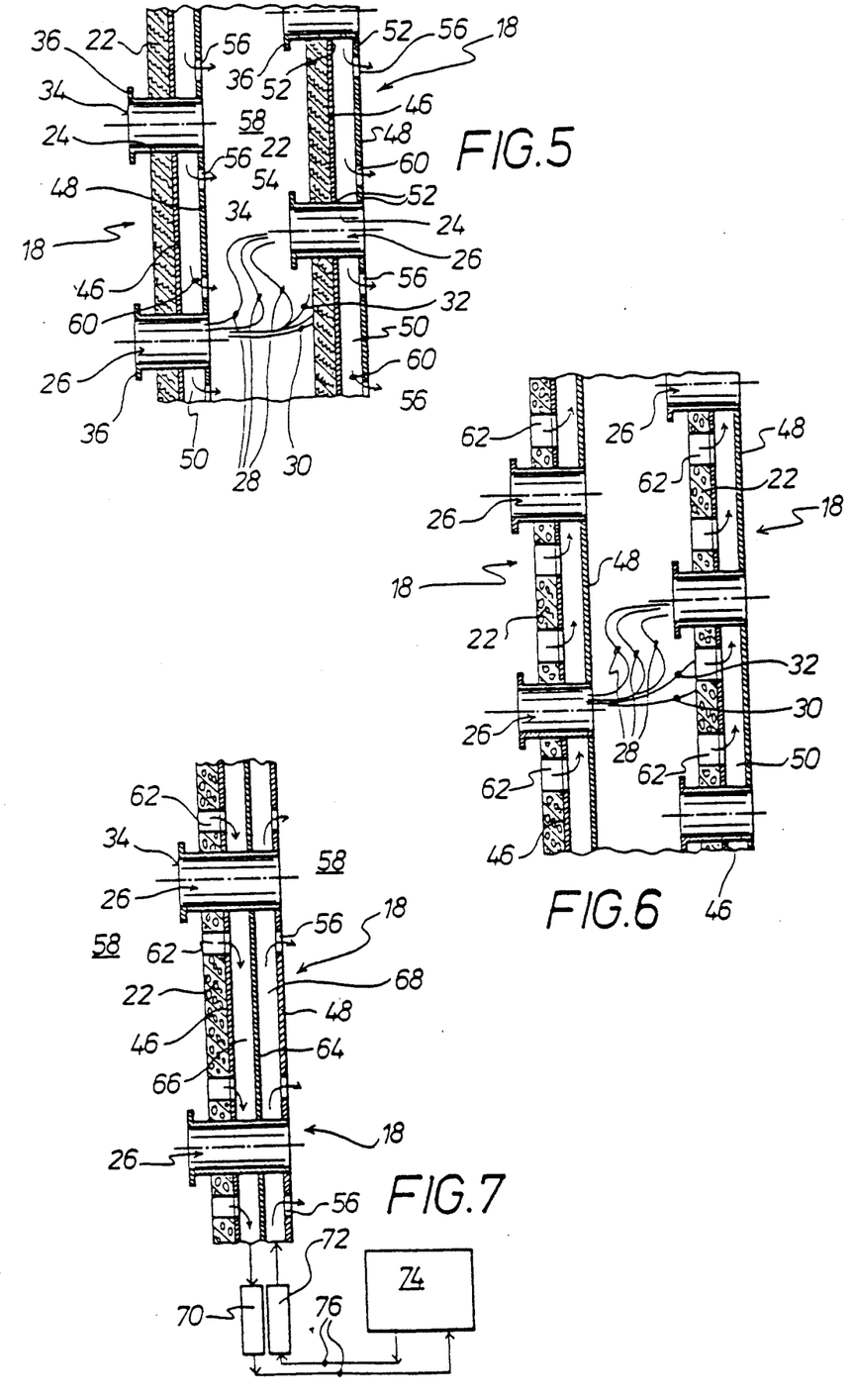
FIG. 5 is a view in longitudinal section through two adjacent filter elements of which portions are shown.
FIG. 6 is a view corresponding to FIG. 5 through another embodiment of two adjacent spaced-apart filter elements.
FIG. 7 is a view in longitudinal section through a further embodiment of a filter element of the filter apparatus, showing a portion of the filter element.

FIG. 5 shows views in longitudinal section of portions of two filter elements 18 which are arranged in succession and at a spacing from each other, in which each plate-like carrier element has two spaced-apart outside walls 46 and 48, defining a central space 50 between them. The two outside walls 46 and 48 have mutually aligned apertures 52. A substrate 22 for a filter medium is provided on the front side of the first outside wall 46, on the upstream side, of each filter element 18. Each substrate 22 has apertures 54 corresponding to the apertures 52 in the outside walls 46, in regard to their distribution and size. The associated guide elements 24 extend sealingly through the apertures 52 in the outside walls 46 and 48 and through the apertures 54 in the associated substrate 22. This construction also provides that the guide elements 24 have an enlarged flanged edge 36 at their front end 34 on the upstream side. Reference numeral 28 again identifies flow lines of the gaseous flow medium which is charged with particles and which flows through the individual openings 26 in the successively arranged, spaced-apart filter elements 18. As in FIG. 2, reference numerals 30 and 32 identify the trajectories of heavy particles which are to be filtered out of the gaseous flow medium and which are retained at the substrate 22 by means of the filter medium.

In the embodiment of the filter apparatus as shown in FIG. 5 the downstream second outside walls 48 of the individual filter elements 18 have through orifices 56 which are spaced from the apertures 52. The through orifices 56 make it possible for a medium to pass from the central space 50 of the individual filter elements 18 into the filter space 58 disposed between the filter elements 18. The arrows 60 indicate the way in which a medium issues from the central space 50 of each individual filter element 18. That medium may be for example a fluid mist which can condense on particles to be filtered out and which thus makes those particles heavier so as to provide a good filter effect.

FIG. 6 shows a portion of a filter apparatus which differs from the portion shown in FIG. 5 in that it is not the second outside walls 48, which are on the downstream side, of the carrier elements of the spaced-apart and successively disposed filter elements 18 that are provided with through orifices 56 (see FIG. 5), but the first outside walls 46 on the upstream side and the substrates 22 which are disposed on the front side of the first outside walls 46. In the construction shown in FIG. 6, the substrates 22 and the first outside walls 46 are provided with through orifices 62 which are spaced from the openings 26 of the filter elements 18. Reference numeral 28 in FIG. 6 also identifies some flow lines of the gaseous flow medium, along which the gaseous flow medium flows through the openings 26 in adjacent filter elements 18. Reference numerals 30 and 32 identify trajectories of particles of different weights, which are transported with the gaseous flow medium and which are to be separated from the gaseous flow medium in order to be filtered out of same. Heavy particles pass along the trajectory 30 and are retained at the substrate 22 by means of the filter medium on the substrate. Somewhat lighter particles move along the trajectory 32 and are deflected towards the through orifices 62 and pass through the orifices 62 into the central space defined by the outside walls 46 and 48 of each filter element 18. In that way it is possible for given particles to be separated out of the filter apparatus in a specific fashion at given locations.

FIG. 7 shows an embodiment of a filter element 18 wherein provided between the first outside wall 46 on the upstream side and the second outside wall 48 on the downstream side is an intermediate wall 64 which divides the central space into two mutually separated central spaces 66 and 68. This construction also provides that there is a substrate 28 for a filter medium on the upstream side of the first outside wall 46. The openings 26 which are delimited by means of guide elements 18 pass through the substrate 22, the two outside walls 46 and 48 and the intermediate wall 64 of the corresponding filter element 18. In accordance with the embodiment illustrated in FIG. 6, the substrate 22 and the first outside wall 46 of each filter element 18 has through orifices 62 which provide a fluid communication between the filter space 58 and the first central space 66. In accordance with the construction shown in FIG. 5, in the embodiment illustrated in FIG. 7 the second outside wall 48 is also provided with through orifices 56 which produce a fluid communication between the second central space 68 and the filter space 58. The first central space 66 is provided with an outlet member 70 which is only diagrammatically indicated in FIG. 7. An inlet member 72 is diagrammatically indicated by a box which is in fluid communication with the second central space 68. Provided between the outlet member 70 and the inlet member 72 is a cleaning means 74 connected to the inlet and outlet members 72 and 70 by means of conduits 76. The particles collected in the first central space 66 can be cleaned in the cleaning means 74, while for example solid components of the particles which are filtered out are separated from gaseous components thereof. The gaseous components can then be passed through the inlet member 72 into the second central space 68 and through the orifices 56 into the filter space 58 so that the pressure drop in the filter apparatus remains negligibly low.

Figure 8:
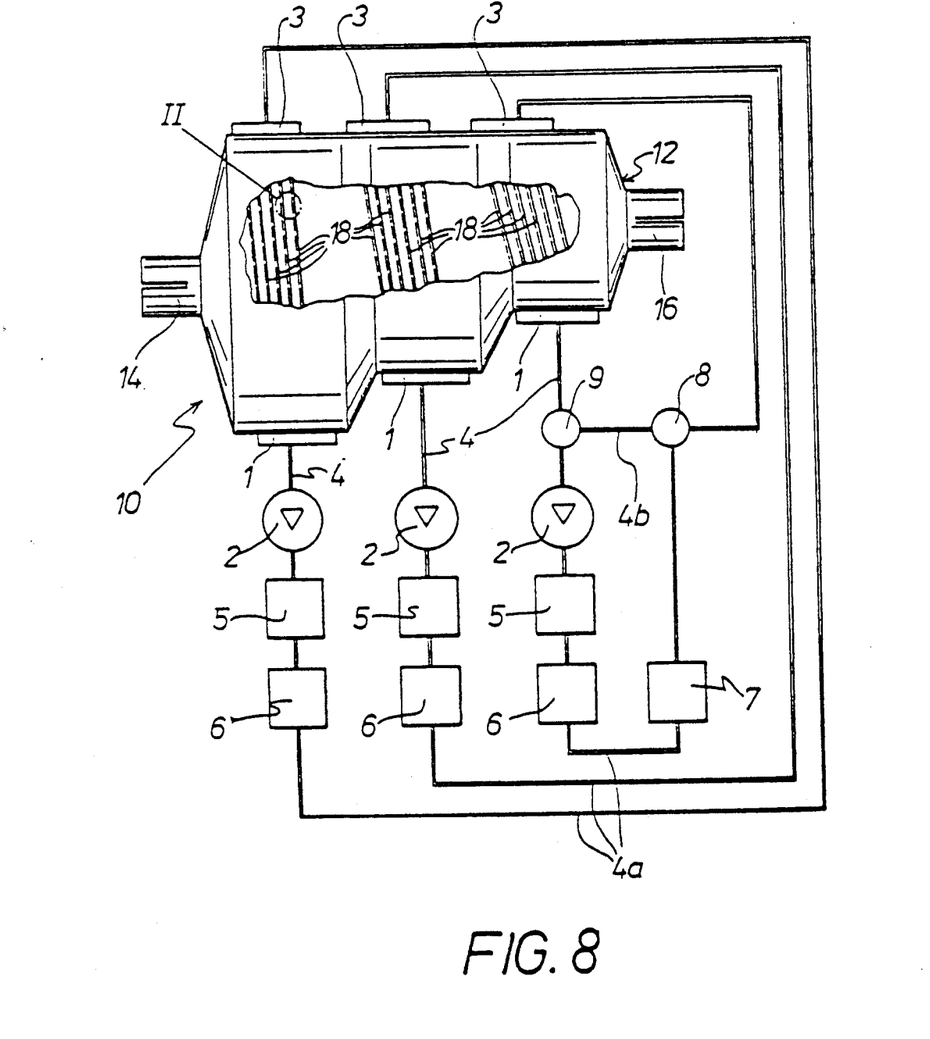
FIG. 8 is a view corresponding to FIG. 1 of a second embodiment of the filter apparatus.

FIG. 8 shows a filter apparatus comprising a housing 12 having an inlet connection 14 and an outlet connection 16. A gaseous flow medium is introduced into the filter apparatus through the inlet connection 14. The gaseous flow medium is charged with solid, liquid or gaseous particles which are to be filtered out of the gaseous flow medium, that is to say separated therefrom, by means of filter elements 18 disposed in the filter apparatus 10. The filter elements 18 are combined together to form groups, wherein each individual group of filter elements has associated therewith its own collecting means 1, its own conveyor means 2 and its own discharge means 3. Each collecting means 1 is in fluid communication with the associated conveyor means 2 by means of a conduit 4, which conveyor means 2 may be a pump. The conveyor means 2 is in fluid communication with the associated discharge means 3, by means of a conduit 4a. A cooling or heating means 5 is connected into the conduit 4a of the each group of filter elements, whereby the filter medium which passes in a circuit or which is circulated by the conveyor means 2 can be cooled or heated as desired in order for the filter medium to be kept at an optimum temperature for filtration purposes. In addition a cleaning or regenerating means 6 is connected into each conduit 4a of a corresponding group of filter elements. Reference numeral 7 denotes a survival storage means which is connected into a conduit 4a. Two change-over switching means 8 and 9 are connected together by means of a by-pass conduit 4b and are connected into the conduits 4 and 4a, which have the survival storage means 7, of the third circuit shown at the right in FIG. 8. FIG. 8 shows a housing 12 of the filter apparatus 10, the internal cross-section of which varies in a stepwise manner between the inlet 14 and the outlet 16, that is to say, it decreases in a stepwise manner. In that way the flow rate of the flow medium between the first group of filter elements at the left and the third group of filter elements at the right becomes correspondingly greater in a stepwise manner. It will also be seen from this figure that the angle of inclination of the filter element of the various groups of filter elements increased in accordance with the increasing rate of flow of the flow medium. The individual groups of filter elements 18 may be supplied with the same filter medium or preferably with different filter media. That is possible because the individual groups of filter elements each have their own circuit for the corresponding filter medium.

A description of the individual collecting means and the discharge means can be found for example in DE 37 11 294 Al. Likewise there should be no need for the cooling or heating means 5, the cleaning or regenerating means 6 and the survival storage means 7 to be described in detail herein because those means are known per se. The survival storage means 7 is connected to the associated conveyor means 2, the associated cooling or heating means 5 and the associated cleaning or regenerating means 6 by the conduits 4a and 4b when the two change-over switching devices 8 and 9 are in the appropriate switching position. In that switching position of the devices 8 and 9, the fluid communication with the associated discharge means 3 and the communication between the associated collecting means 1 and the change-over switching device 9 are interrupted. It is also possible however for the survival storage means 7 to be in fluid communication with the corresponding discharge means 3 in order to provide in the filter elements 18 of the associated group of filter elements for a feed of the filter medium in that group, for the filter medium to survive while the filter apparatus 10 is not in use over a prolonged period of time.

I claim:

1. A filter apparatus for filtering solid, liquid, or gaseous, electrically charged or electrically uncharged particles out of a gaseous flow medium which flows through the filter apparatus, comprising filter elements (18) which are spaced from each other in the direction of flow of the gaseous medium to the filter apparatus, wherein each filter element (18) has a plate-like carrier element (20; 46; 48; 64) with spaced-apart openings (26) of adjacent plate-like carrier elements are displaced relative to each other in such a way that they are not aligned with each other, and that each plate-like carrier element (20; 46; 48; 66) has at least on its upstream side a substrate (22) which is provided for the storage of a filter medium and which is provided with openings (26) corresponding to the openings (26) in the associated plate-like carrier element, characterized in that each plate-like carrier element (20; 46; 48; 66) comprises a material which impervious in relation to the filter medium, and that each opening (26) in the plate-like carrier element has a sleeve-like guide (24) for the flow medium, which extends around the edge of the opening (26) and extends over the upstream side of the respective substrate, and which is directed at least approximately normal to the plate-like carrier element.

2. A filter apparatus according to claim 1 characterised in that the/each guide element (24) is in the form of a collar which projects from the plate-like carrier element (20) on the upstream side of the carrier element (20).

3. A filter apparatus according to claim 1 wherein said guide element (24) is enlarged to form a flanged edge (36) at its front end (34) on the upstream side, which is remote from the plate-like carrier element (20).

4. A filter element according to claim 1 wherein said guide element (24) is formed in one piece with the plate-like carrier element (20).

5. A filter apparatus according to claim 1 characterised in that the/each guide element (24) is in the form of a sleeve element which passes through the associated plate-like carrier element (20; 46, 48; 64), one end portion (38) of the sleeve element projecting beyond the carrier element on the upstream side and the second end portion (40) of the sleeve element projecting beyond the carrier element on the downstream side thereof.

6. A filter apparatus according to claim 5 characterised in that the/each guide element (24) is in the form of a venturi nozzle.

7. A filter apparatus according to claim 5 wherein each guide element (24) has at least one fixing member (42,44) with which the guide element (24) is fixed in one of the openings (26) in the plate-like carrier element (20; 46; 48; 64).

8. A filter apparatus according to claim 1 wherein each plate-like carrier element has two spaced-apart outside walls (46,48) which have mutually aligned apertures (52) through each of which a respective one of the associated guide elements (24) sealingly extends, wherein either the first outside wall (46) on the upstream side and the associated substrate (22) or the second outside wall (48) on the downstream side is provided with through orifices (56;62) which are spaced from the openings (26) for the guide elements (24).

9. A filter apparatus according to claim 8 characterised in that provided between the two outside walls (46, 48) of the/each filter element (18) is an intermediate wall (64) which forms two mutually separated central spaces (66, 68), wherein the intermediate wall (64) and the two outside walls (46, 48) and the associated substrate (22) have mutually aligned through openings (26), through each of which a respective one of the associated guide elements (24) sealingly extends, that both outside walls (46, 48) and the associated substrate (22) have through orifices (52, 54) which are spaced from the openings (26) for the guide elements, and that the first central space (66) defined by the intermediate wall (64) and the first outside wall (46) on the upstream side is provided with an outlet member (70) and the second central space (68) defined by the intermediate wall (64) and the second outside wall (48) on the downstream side has an inlet member (72).

10. A filter apparatus according to claim 9 characterised in that a cleaning means (74) is provided between the inlet member (72) associated with the second central space (68) and the outlet member (70) associated with the first central space (66).

11. A filter apparatus according to claim 1 wherein at least individual filter elements (18) are connected to a terminal of a DC voltage source.

12. A filter apparatus according to claim 1 wherein the filter elements (18) are combined together to form groups, wherein each individual group of filter elements has associated therewith its own collecting, conveyor, and discharge means (1,2,3).

13. A filter apparatus according to claim 12 characterised in that the individual groups of filter elements are wetted with different filter media.

14. A filter apparatus according to claim 12 wherein at least individual groups of filter elements are provided with their own respective cooling and/or heating means (5) for the associated filter medium.

15. A filter apparatus according to claim 12 wherein at least some of the groups of filter elements are provided with their own cleaning or regenerating means (6) for the associated filter medium.

16. A filter apparatus according to claim 12 wherein at least one filter medium contains a culture of enzymes.

17. A filter apparatus according to claim 12 wherein at least one filter medium contains a bacterial culture.

18. A filter apparatus according to claim 12 wherein at least one filter mechanism contains microorganisms.

19. A filter apparatus according to claim 16 wherein a survival storage means (7) is provided for the filter medium.

20. A filter apparatus according to claim 12, and further comprising a housing (12) which is of a varying internal cross-section between an inlet (14) and an outlet (16) along the longitudinal extent of the housing, wherein the filter elements (18) or groups of filter elements arranged in the housing (12) are each of a surface area corresponding to the corresponding internal cross-section of the housing (12).

21. A filter apparatus according to claim 20 characterised in that the internal cross-section of the housing (12) decreases in a direction from the inlet (14) to the outlet (16).

22. A filter apparatus according to claim 20 wherein the internal cross-section of the housing (12) decreases in a stepwise manner in a direction from the inlet (14) to the outlet (16).

23. A filter apparatus according to claim 1 wherein the filter elements (18) are of a flat configuration and are arranged inclinedly at an angle of inclination from the top front towards the bottom rear relative to the longitudinal axis of the housing (12), which extends between the inlet (14) and the outlet (16).

24. A filter apparatus according to claim 23 characterised in that the angle of inclination is variable or is set in dependence on the flow rate of the flow medium to and through the filter apparatus.

* * * * *